US009753638B2

(12) United States Patent
Pickersgill

(10) Patent No.: US 9,753,638 B2
(45) Date of Patent: Sep. 5, 2017

(54) METHOD AND APPARATUS FOR ENTERING SYMBOLS FROM A TOUCH-SENSITIVE SCREEN

(75) Inventor: Jason Douglas Pickersgill, Los Angeles, CA (US)

(73) Assignee: THOMSON LICENSING, Issy les Moulineaux (FR)

( * ) Notice: Subject to any disclaimer, the term of this patent is extended or adjusted under 35 U.S.C. 154(b) by 351 days.

(21) Appl. No.: 14/396,125

(22) PCT Filed: Jun. 6, 2012

(86) PCT No.: PCT/US2012/041041
§ 371 (c)(1),
(2), (4) Date: Oct. 22, 2014

(87) PCT Pub. No.: WO2013/184106
PCT Pub. Date: Dec. 12, 2013

(65) Prior Publication Data
US 2015/0121293 A1 Apr. 30, 2015

(51) Int. Cl.
*G06F 3/048* (2013.01)
*G06F 3/0488* (2013.01)
(Continued)

(52) U.S. Cl.
CPC ........ *G06F 3/04883* (2013.01); *G06F 3/0237* (2013.01); *G06F 3/0482* (2013.01); *G06F 3/0485* (2013.01); *G06F 3/04842* (2013.01)

(58) Field of Classification Search
CPC ............. G06F 3/04883; G06F 3/04842; G06F 3/0485; G06F 3/0482
See application file for complete search history.

(56) References Cited

U.S. PATENT DOCUMENTS 4,771,385 A 9/1988 Egami et al.
5,276,794 A * 1/1994 Lamb, Jr. ............ G06F 3/04883
345/173

(Continued)

FOREIGN PATENT DOCUMENTS

CN 101739167 6/2010
CN 102314296 1/2012
(Continued)

OTHER PUBLICATIONS

Search report dated Feb. 6, 2013.

*Primary Examiner* — William Bashore
*Assistant Examiner* — Gregory A Distefano
(74) *Attorney, Agent, or Firm* — Brian J. Dorini; Patricia A. Verlangieri

(57) ABSTRACT

A method enables a user to enter symbols into an entry field from a touch-sensitive screen. According to an exemplary embodiment, the method is used in a touch-screen device and includes steps of: detecting touching an entry field displayed on said touch screen device; displaying a plurality of symbols in a single row in response to said touching receiving step; detecting touching a first one of said displayed symbols; and if said touching is ended by stopping touching said touch screen device, a second one of said displayed symbols is detected to be last touched in said single row, and said second one of said displayed symbols is different from said first one of said displayed symbols, entering said second one of said displayed symbols into said entry field.

15 Claims, 11 Drawing Sheets

(51) Int. Cl.
*G06F 3/023* (2006.01)
*G06F 3/0482* (2013.01)
*G06F 3/0484* (2013.01)
*G06F 3/0485* (2013.01)

(56) References Cited

U.S. PATENT DOCUMENTS

| | | | |
|---|---|---|---|
| 5,574,482 | A | 11/1996 | Niemeier |
| 7,427,933 | B2 | 9/2008 | Deas |
| 9,292,082 | B1* | 3/2016 | Patel ................ G02B 27/017 |
| 2003/0067495 | A1 | 4/2003 | Pu et al. |
| 2003/0189553 | A1* | 10/2003 | Goren ................ G06F 3/04886 345/173 |
| 2004/0070571 | A1 | 4/2004 | Woodard et al. |
| 2007/0274736 | A1* | 11/2007 | Sato ................ G03G 15/5004 399/88 |
| 2007/0296615 | A1* | 12/2007 | Raguseo ................ G06F 3/0237 341/51 |
| 2008/0001927 | A1 | 1/2008 | Yoshida |
| 2008/0270897 | A1 | 10/2008 | Jawerth et al. |
| 2009/0140995 | A1 | 6/2009 | Kang |
| 2010/0070908 | A1* | 3/2010 | Mori ................ G06F 3/0237 715/773 |
| 2010/0277414 | A1 | 11/2010 | Tartz et al. |
| 2011/0115722 | A1 | 5/2011 | Mok |
| 2011/0163963 | A1* | 7/2011 | Skarine ................ G06F 3/0482 345/173 |
| 2011/0234524 | A1 | 9/2011 | Longe et al. |
| 2012/0029910 | A1* | 2/2012 | Medlock ................ G06F 3/0237 704/9 |
| 2013/0285927 | A1* | 10/2013 | Pasquero ................ G06F 3/0237 345/173 |

FOREIGN PATENT DOCUMENTS

| | | |
|---|---|---|
| CN | 102375656 | 3/2012 |
| JP | 61267885 | 11/1986 |
| JP | 2005092521 | 4/2005 |
| JP | 2006350409 | 12/2006 |
| WO | WO02095524 | 12/2003 |

* cited by examiner

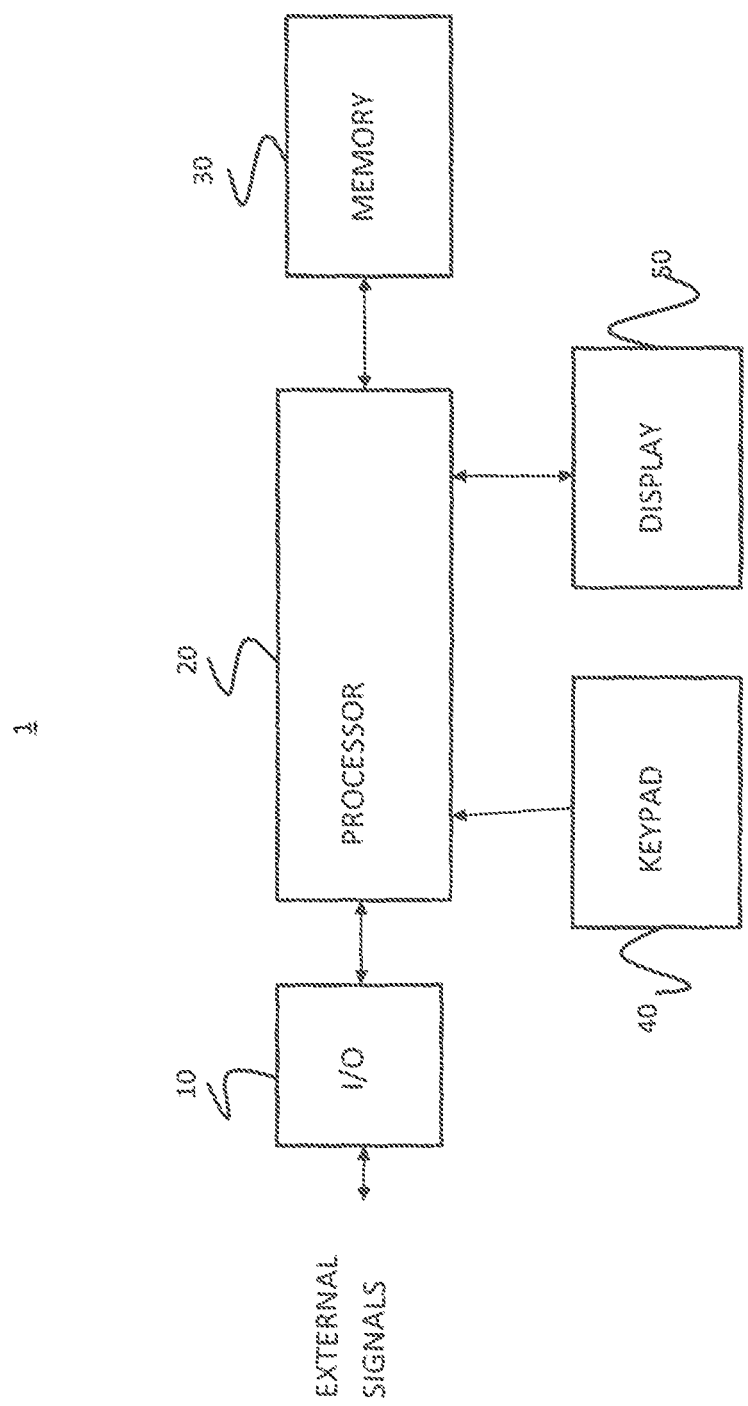

FIG. 2     200
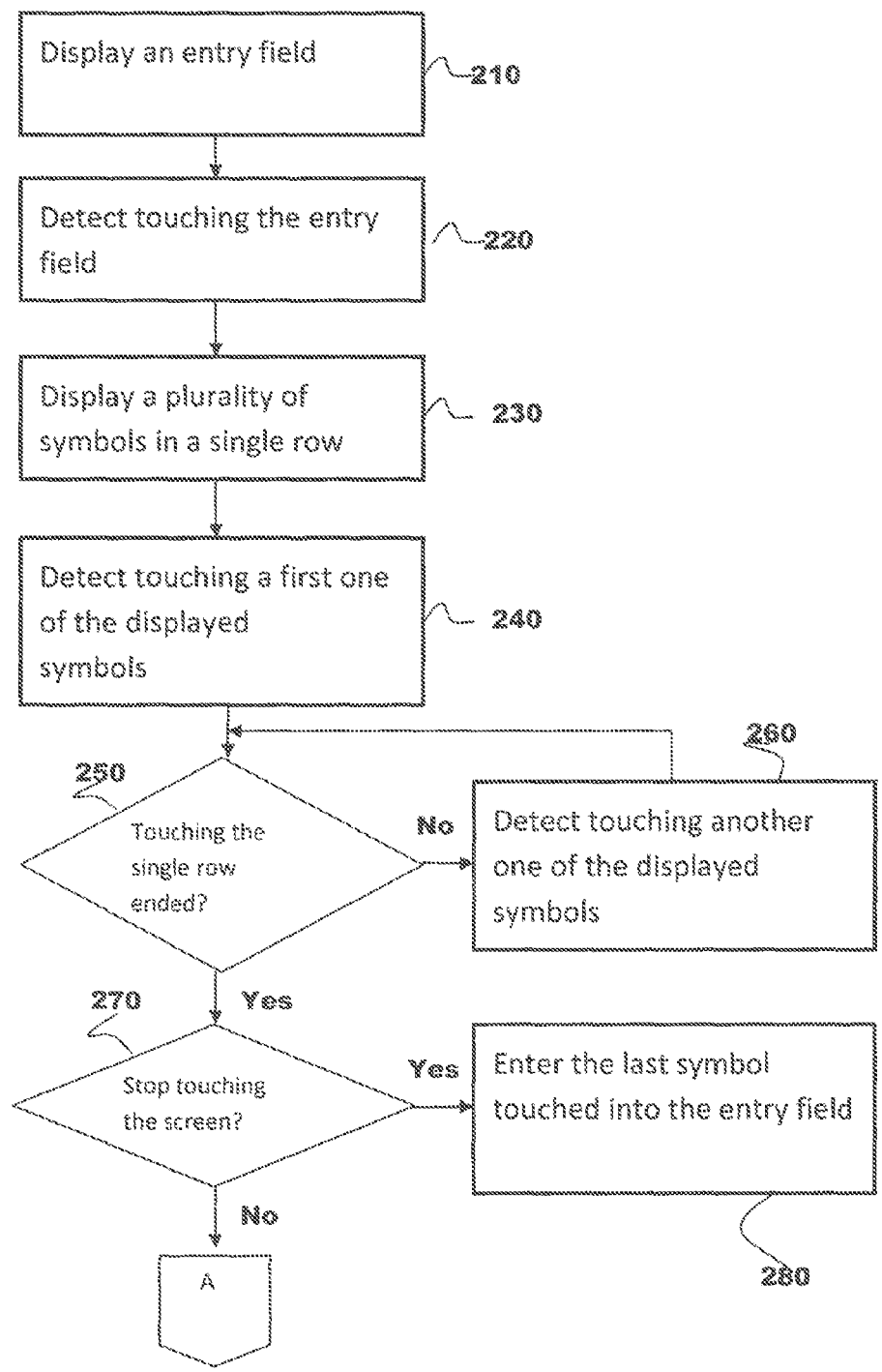

METHOD AND APPARATUS FOR ENTERING SYMBOLS FROM A TOUCH-SENSITIVE SCREEN

This application claims the benefit, under 35 U.S.C. §365 of International Application PCT/US2012/041041 filed Jun. 6, 2012 which was published in accordance with PCT Article 21(2) on Dec. 12, 2013 in English.

BACKGROUND OF THE INVENTION

Field of the Invention

The present invention generally relates to methods and apparatuses for entering symbols from a touch-sensitive screen, and more particularly, to methods and apparatuses for enabling a user to enter symbols into a displayed entry field by sliding on a displayed single row of symbols.

Background Information

The methods for inputting data using touch-sensitive screen usually involves displaying a conventional keyboard on the screen, for example, a QWERTY keyboard, touching or tapping a key in the displayed keyboard with a finger or a handheld device called a stylus to select an alphabet represented by the touched or tapped key. However, in a portable device, such a cell phone, the screen is small and it is difficult to accurately touch a desired symbol in the displayed keyboard. The problem may still exist for an elderly even if the size of the touch-sensitive screen of the touch screen device is larger. Accordingly, there is a need in the art to address the foregoing issues and thereby provide improved methods for inputting symbols from a touch-sensitive screen.

SUMMARY OF THE INVENTION

The inventor recognizes that displaying symbols in a single row and sliding in a single row to a desired symbol is much easier for a user to correctly select a symbol.

In accordance with an aspect of the present invention, a method for entering symbols using a touch screen device is disclosed. The method comprising steps of detecting touching an entry field displayed on the touch screen device; displaying a plurality of symbols in a single row in response to the touching receiving of the entry field; detecting touching a first one of the displayed symbols; and if the touching is ended by stopping touching the touch screen device, a second one of the displayed symbols is detected to be last touched in said single row, and the second one of the displayed symbols is different from the first one of the displayed symbols, entering the second one of the displayed symbols into the entry field.

The method may include steps of displaying a list having at least one word beginning with the second symbol in the single row if the second symbol is an alphabet and if the touching is ended by sliding away from the single row; and detecting touching a first one of the at least one word and if the touching on the list is ended, entering the first one of the at least one word into the entry field.

The method may include steps of displaying an icon next to the first one of the at least one word in the entry field, such that when the icon is touched, the one of the at least one word is removed from said entry field and removing the icon from the entry field upon receiving another entry to the entry field.

In accordance with still yet another aspect of the present invention, a touch screen device is disclosed. According to an exemplary embodiment, the touch screen device comprises a memory for storing programs; a display (5) having touch-sensitive screen; and a processor operative to display an entry field on the touch-sensitive screen in executing a program from the memory, detecting touching the entry field; display a plurality of symbols in a single row in response to the touching the entry field; detect touching a first one of said displayed symbols; and if said touching is ended by stopping touching the touch-sensitive screen, a second one of the displayed symbols is detected to be last touched in the single row, and the second one of the displayed symbols is different from the first one of said displayed symbols, enter the second one of said displayed symbols into the entry field.

In accordance with still yet another aspect of the present invention, a touch screen device is disclosed. According to an exemplary embodiment, the touch screen device comprises means for storing programs; a display having touch-sensitive screen; and a processing means operative to display an entry field on the touch-sensitive screen in executing a program from the memory, detecting touching the entry field; display a plurality of symbols in a single row in response to the touching the entry field; detect touching a first one of the displayed symbols; and if the touching is ended by stopping touching the touch-sensitive screen, a second one of the displayed symbols is detected to be last touched in the single row, and the second one of the displayed symbols is different from the first one of the displayed symbols, enter the second one of said displayed symbols into the entry field.

The aforementioned summaries of preferred and exemplary embodiments of the present invention are merely illustrative of the inventive concepts presented herein, and are not intended to limit the scope of the present invention in any manner.

BRIEF DESCRIPTION OF THE DRAWINGS

The above-mentioned and other features and advantages of this invention, and the manner of attaining them, will become more apparent and the invention will be better understood by reference to the following description of exemplary embodiments of the invention taken in conjunction with the accompanying drawings, wherein:

FIG. 1 shows a block diagram of a touch screen device according to an exemplary embodiment of the present invention;

Figure 2:
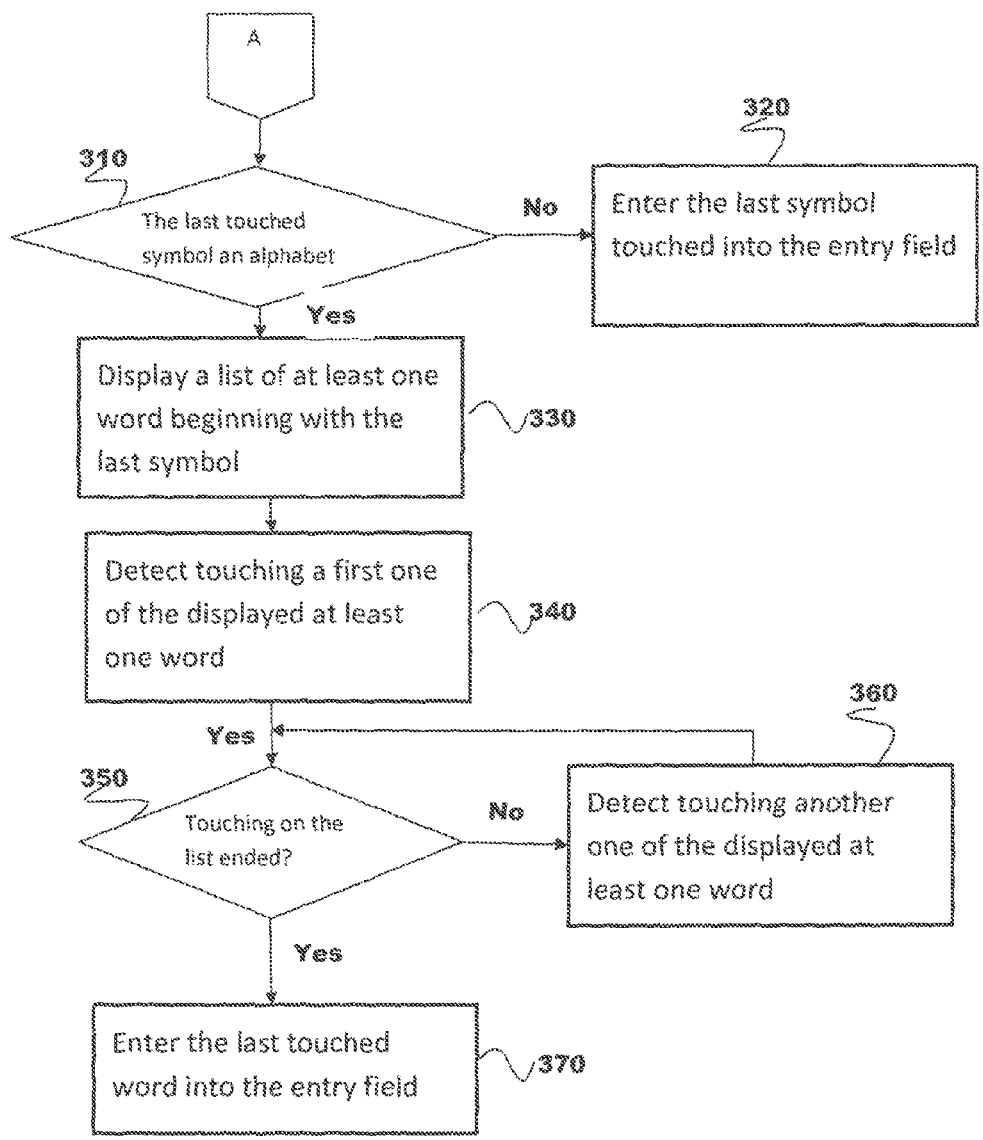
FIG. 2 shows a flowchart illustrating steps according to an exemplary embodiment of the present invention.

The exemplifications set out herein illustrate preferred embodiments of the invention, and such exemplifications are not to be construed as limiting the scope of the invention in any manner.

DESCRIPTION OF THE PREFERRED EMBODIMENTS

Referring to FIG. 1, an exemplary, non-limiting aspect of a portable computing device (PCD) is shown and is generally designated 1. As shown, the PCD 1 comprises input/output (I/O) means such as I/O block 10, processing means such as processor 20, memory means such as memory 30, and user interface which includes a display 50 and optionally a keypad 40. Although illustrating a PCD as the touch screen device, the principles of invention can be applied to any apparatus and device having a display with touch-sensitive screen. The display may be any display, such as LCD and plasmas, and the display may be a part of a TV, a PC, a mobile phone, a tablet, a digital camera, a camcorder, and a DVD player. The display may be used with a set-top box and any of the above-mentioned devices. For clarity of description, certain conventional elements associated with the PCD 1 such as certain control signals, power signals and/or other elements may not be shown in FIG. 1.

I/O block 10 is operative to perform I/O functions of the PCD 1. According to an exemplary embodiment, I/O block 10 is operative to receive signals such as audio, video and/or data signals in analog and/or digital format from a broadcast source such as an Internet source, and other devices such as a PC, a hard disk connected through, for example, USB, network, or HDMI interfaces. I/O block 10 may also be operative to output signals to an external device.

Processor 20 is operative to perform various signal processing and control functions of the PCD 1. According to an exemplary embodiment, processor 20 processes the audio, video and/or data signals provided from I/O block 10 by performing functions including tuning, demodulation, forward error correction, transport processing, and decompressing functions to thereby generate digital data representing audio, video and/or data content. The digital data produced from such processing functions may be provided for further processing and/or output to the display 50.

Processor 20 is also operative to execute software code that facilitates and enables performance of the various embodiments and methods of the present invention described herein. Further details regarding these aspects of the present invention will be provided later herein. Processor 20 is also operative to perform and/or enable other functions of the PCD 1 including, but not limited to, executing programs stored in the memory 30, processing user inputs made via the keypad 40, the touch-sensitive elements of the screen of the display 50, and other user input devices (not shown), administering one or more timers, enabling on-screen displays, reading and writing data from and to memory 30, and/or other operations. Processor 30 may be embodied using one or more integrated circuits (ICs).

According to the principles of the invention, during execution of a program such as an Internet browser, which may be stored in the memory 30, the processor 20 may be operative to cause an entry field, such as a text entry field, to be displayed on the touch-sensitive portion of the screen of the display 50; detect touching the entry field by a user; cause the display of a plurality of symbols in a single row in response to the detection of the touch on (or touching) the entry field; detect touching a first one of the displayed symbols in the single row; detect whether the touch on (or touching) the single row is ended; if the touch on (or touching) the single row is not end, detect touch on (or touching) another symbol in the single row; if the touch on (or touching) the single row is ended, determine if the ending is caused by stopping touching the screen of the display 50; if the ending is caused by stopping touching the screen of the display 50, enter the last touched symbol into the entry field; and if the ending is caused by sliding away from the single row, display a list of at least one word; detect touching one of the displayed at least one word; detect if the touch on (or touching) the list is ended, enter the last touched one of the displayed at least one word into the entry field. More details will follow.

Memory 30 is operatively coupled to processor 20 and performs data storage functions of the PCD 1. Depending on implementation, at least a portion of memory 30 may be included on the same IC(s) as processor 20. According to an exemplary embodiment, memory 30 stores data including, but not limited to, software code, on-screen display (e.g., menu) data, user selection/setup data, and/or other data. The memory 30 may also include a hard disk drive (HDD), or DVD drive, PROM, SRAM, or combination thereof.

The keypad 40 may be used by a user to control the PCD 1. For example, a menu key (not shown) in the keypad 40 may be used to activate a main menu, an enter key for confirming that the text entry to a text entry field has been completed, and arrow keys for moving a cursor left, right, up, and down on the screen of the display 50. The processor 20 is operative to detect a key press signal and determine which key is activated and perform the appropriate action in response.

The display 50 includes a touch-sensitive area, which may cover the entire or just a portion of the screen of the display 50. The touch-sensitive area includes conventional touch-sensitive elements. The processor 20 is operative to detect which elements are touched in a conventional manner, so that it can determine which displayed symbol or icon is touched in a conventional manner.

Referring to FIG. 2, a flowchart 200 illustrating steps according to an exemplary embodiment of the present invention is shown. For purposes of example and explanation only, the steps of FIG. 2 may be explained hereinafter with specific reference to the exemplary embodiments of FIG. 1 described above and FIGS. 3-10 described later. However, it should be intuitive to those skilled in the art that the inventive principles embodied in the flowchart of FIG. 2 may also be applied to other embodiments and/or implementations. Moreover, the steps of FIG. 2 are exemplary only, and are not intended to limit the present invention in any manner.

Figure 3:
FIG. 3 shows an exemplary text entry field displayed on the touch-sensitive screen portion of the display in the touch screen device illustrated in FIG. 2.
Figure 4:
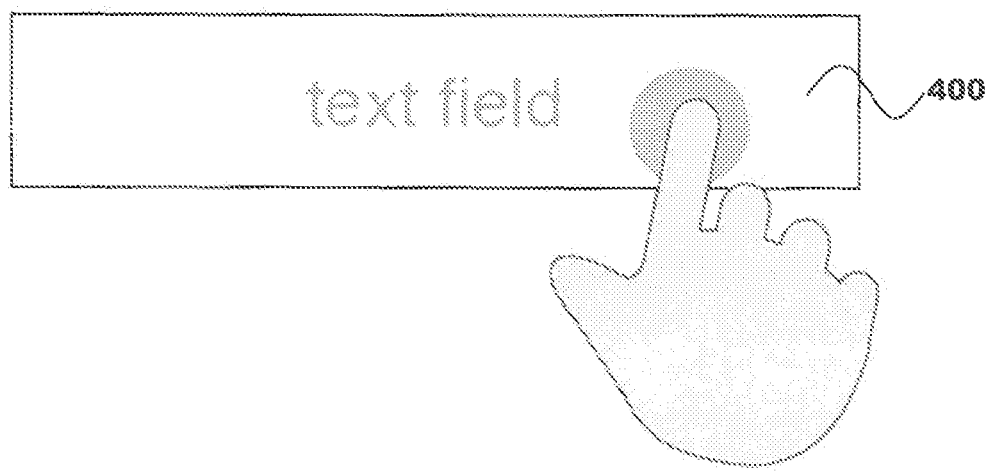
FIG. 4 shows an exemplary touching the text entry field illustrated in FIG. 3.
Figure 5:
FIG. 5 shows an exemplary display of a single row having symbols for user selection in response to a touch on (or touching) the text entry field.

At step 210, the processor 20 during an execution of a software program stored in memory 30 displays an entry field, such as the text entry field 400 shown in FIG. 3, on the touch-sensitive screen portion of the display 50. When a user touches the text field as shown in FIG. 4, the processor 20 detects the touch on (or touching) the entry field 400 at step 220. In response, the processor 20 may display a mark, such as a circle, around the touching area acknowledging that the touch on (or touching) the entry field 400 has been detected. According to the principles of the invention, in response to the detection or receipt of a touch on (or touching) the entry filed 400, the processor 20 displays at the end of the touch a plurality of symbols in a single row, such as the single row 410 of capital English alphabets, as shown in FIG. 5. The symbols are not limited to English alphabets and may include displayable ASCII characters, graphics such as icons, alphabets in a language other than English, and combination thereof.

A touch on (or touching) the entry field 400 means that a portion of the touch is inside the entry field 400.

The single row 410 is preferably arranged horizontally, i.e., having an east-west orientation. However, the orientation is not limited to east-west. The single row may be oriented in any manner, such as vertically, 45 degrees, and other slopes with respect to a horizontal line.

In order to select a symbol on the displayed symbols in the single row 410, a user must touch another symbol in the single row 410 and the touch must continue from that another symbol to the selected symbol. In other words, a user must slide from that another symbol to the selected symbol. Preferably, a user should start the touch on the rightmost or leftmost symbol on the single row 410 and slides to the selected symbol. In the process, the processor 20 is operative to detect all the symbols that have been touched. For example, in FIG. 6, the user touches the single row 410 from symbol B to symbol T. The last touched symbol T in this example is selected and entered into the entry field 400.

The touch can be done by a finger or a handheld device, such as a stylus.

The single row 410 may be confined within a marked area (not shown) having one mark at one end and the other at the other end. The marks may be just the edges of the screen of the display 50. The single row 410 may be longer than the marked area for the single row 410. In this case, the single row 410 wraps around the marked area. For example, a user may slide on the single row in a first direction until hitting a first mark in the marked area. At this point, the processor 20 at every predetermined interval shifts an immediate next symbol in the first direction into the position of the last displayed symbol, shifts all displayed symbols one position in the second direction opposite to the first direction, and removes the display of the first symbol, which has been shifted out of the marked area. Sliding in the second direction, the system works in a similar manner except in an opposite direction. The predetermined interval may be user adjustable, so that a user can select an interval giving the user sufficient time to see the newly displayed symbol.

When a touch on a symbol is detected, the processor 20 may display the touched symbol on a different location not overlapping with the single row. For example, at FIG. 6, the alphabet T is touched and a bigger copy of T is displayed on the top of the single row 410 where the symbol T is located. This feature enables the user more accurately select a symbol because the user can see the currently touched symbol more easily. Additionally, the processor 20 may display a mark, such as a purple circle, around the touched area to acknowledge the user that the touch on that symbol has been detected.

Returning back to FIG. 2, the processor 20 detects the touching a first one of the symbols in the single row 410 at step 240. The processor 20 then determines if the touch on (or touching) the single row 410 has ended at step 250. There is a touch on (or touching) the single row 410 as long as a portion of the touch is still within the display area for the single row 410. The touch on (or touching) the single row 410 is ended by either stopping touching the screen of the display 50 or sliding away from the single row 410. If the touching does not leave the single row 410, the processor 20 continues to receive or detect touching another symbol on the single row 410 at step 260 and the process goes back to step 250.

If the processor 20 determines that the touch on (or touching) the single row 410 is ended and the ending is caused by stopping touching the screen of the display 50 at step 270, the processor 20 enters the last symbol touched into the entry field 400 at step 280. As noted above, the selected symbol must not be the one first touched one in the sliding. Thus, the last touched symbol must be a different one from the symbol first touched.

Figure 6:
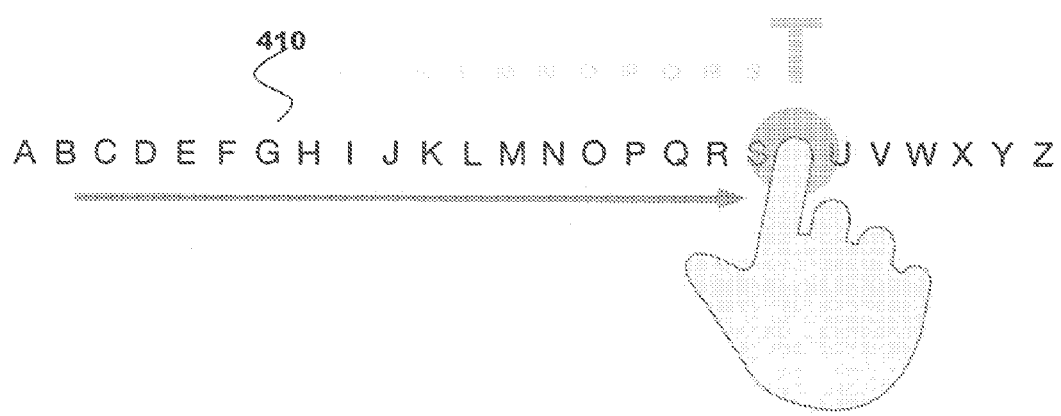
FIG. 6 shows an example of sliding from symbol B to symbol T in the single row illustrated in FIG. 5.

If the touch on (or touching) the single row 410 is ended and the ending is caused by sliding away from the single row 410, an additional inventive feature, as discussed below, can be implemented. If the additional inventive feature is not implemented or is implemented but disabled by a user, once the processor 20 detects the touch on (or touching) the single row 410 is ended, the processor 20 enters the last touched symbol into the entry field. For example, if T in FIG. 6 is the last touched symbol in the single row 410, the processor 20 enters 'T' into the entry field 400 when the ending is detected. A user may delete an entered symbol by touching an icon (not shown) on the screen of the display 50 or activating a key in the keypad 40.

If the additional inventive feature is implemented and enabled and the processor 20 detects the touch on (or touching) the single row 410 is ended and the ending is caused by sliding away from the single row 410 at step 270, the processor 20 determines if the last touched symbol is an alphabet at step 310. If the last touched symbol is not an alphabet, the processor 20 enters the last touched symbol into the entry field 400 at step 320. If the last touched symbol is an alphabet, the processor 20 proceeds to display a list of at least one word beginning with that alphabet at step 330. The list is displayed, such that each word in the list is displayed perpendicular to the direction of sliding away. The direction preferably is perpendicular to the single row 410, such that each word on the list is parallel to the single row 410, but not overlapping with the single row 410.

Figure 7:
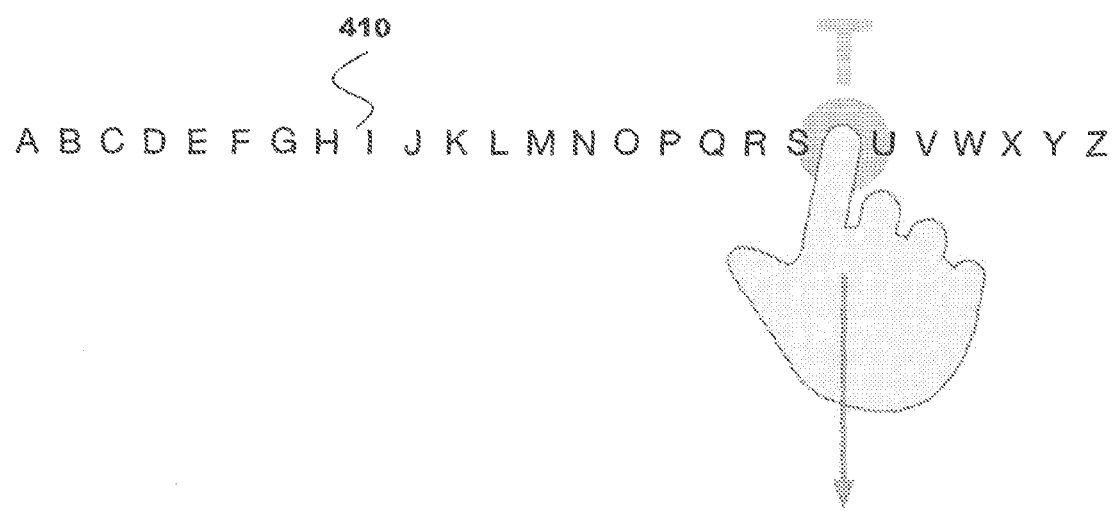
FIG. 7 shows an example of sliding away from the single row illustrated in FIG. 6.
Figure 8:
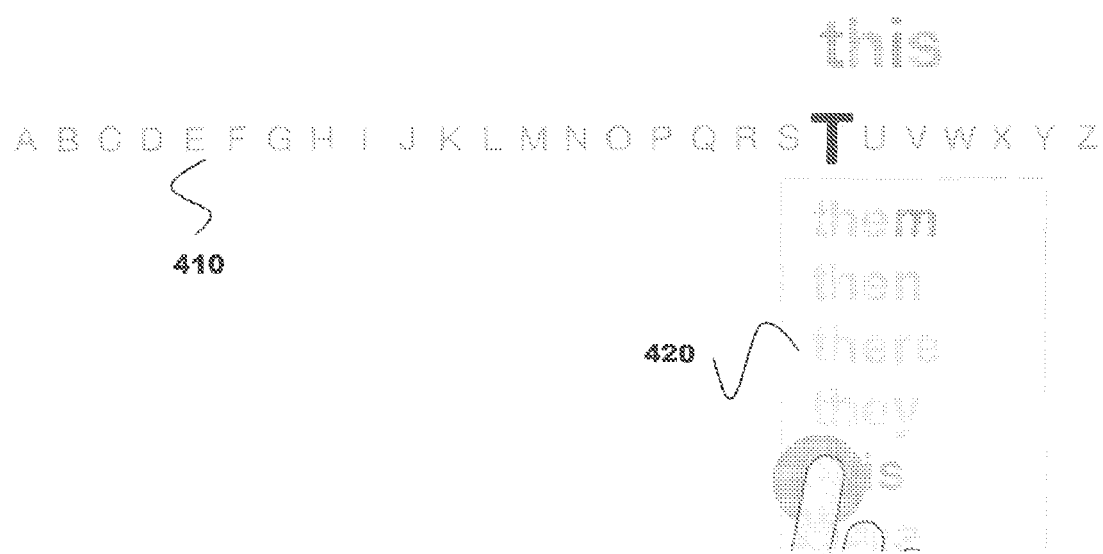
FIG. 8 shows an example of displaying a list of words beginning with the last touched symbol T in the single row in response to sliding away from the single row.

FIG. 7 shows an example that the user's touch is about to slide away from the single row 410. Upon detecting of that the sliding is beyond the single row 410, the processor 20 displays a list 420 of words beginning with T, as shown in FIG. 8, because T is the last symbol touched in the single row 410. When the user touches the first one of the at least one word on the list 420, the processor 20 will detect the touching at step 340. The processor 20 then determines if the touch is ended on the list 420 at step 350. There is a touch on (or touching) the list 420 as long as a portion of the touch is within the list 420. A touch on (or touching) the list 420 is ended by either stopping touching the screen of the display 50 or sliding away from and beyond the list 420.

If the processor 20 determines that the touch on (or touching) the list 420 is not ended, the processor 20 should detect touching another word on the list 420 at step 360 and the process goes back to step 350.

Figure 9:
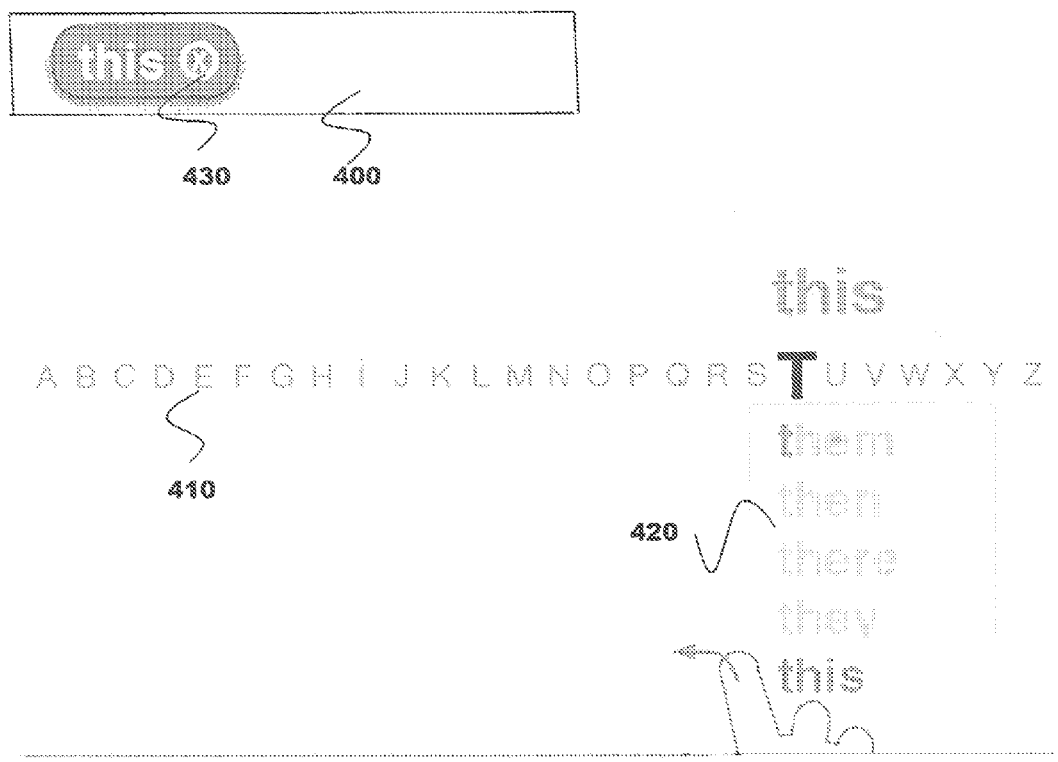
FIG. 9 shows an example of entering the last touched word in the list in response to the end of touching the list.
Figure 10:
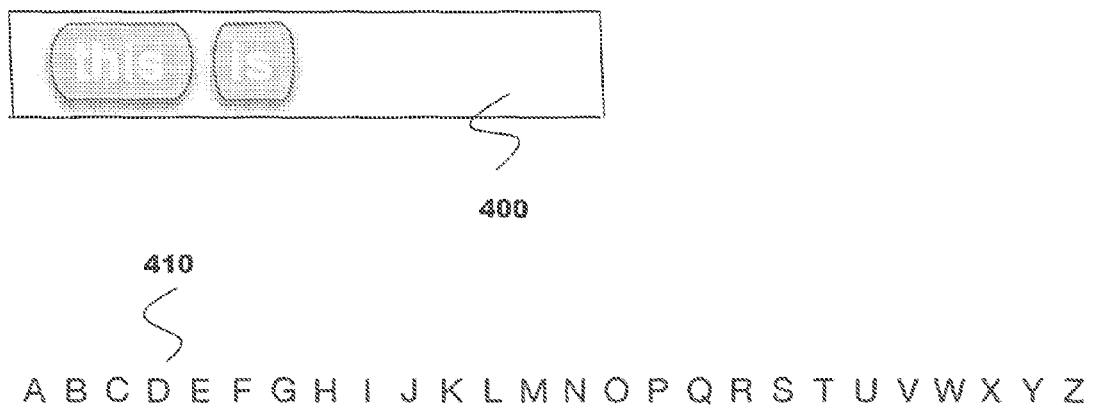
FIG. 10 shows an example of two words being entered to the text entry field illustrated in FIG. 3.

If the processor 20 determines that touching the list 420 is ended, the processor 20 enters the last touched word into the entry 400. For example, as shown in FIG. 9, the last touched word is "this" and "this" is entered into the entry field 400. The entered word "this" may be displayed with a delete icon 430, so that when a user touches the delete icon 430, the processor 20 will remove that word from the entry field 400. The delete icon 430 is removed from the entry after another word has been entered into the entry field 400 or a predetermined time has elapsed. The entered word may be shown with a balloon around it, as shown in FIGS. 9 and 10.

Similar to the receipt or detection of a touch on (or touching) a symbol on the single row 410, the processor 20 may acknowledge receipt or detection of a touch on (or touching) a word by displaying the word in a predefined location not overlapping with the single row 410 and the list 420, For example, on FIG. 9, the word "this" is touched, and the word "this" is displayed on the top of the single row 410 where alphabet T is displayed.

The list 420 may extend beyond the screen of the display 50. If it does, the words wrap around the list area in the screen. That is, in a predetermined interval, the next word in sequence, which was previously invisible, takes the position of the last word on the list in the sliding direction, all previously words except the first one are move one position in the opposite direction of the sliding, and the first word on the list thus disappears. Sliding in the other direction on the list 420 has the same effect but in reverse direction.

A user may enter an additional symbol or word by repeating the process shown in FIG. 2. FIG. 10 illustrates that the complete entry is "this is." When the entry is completed, the user informs the system by activating the enter button (not shown) in the keypad 40 or touching an icon or button (not shown) on the screen of the display 50 in a conventional manner. As an optional feature, when a word was first entered to the entry field 400, the word in the entry field 400 is displayed in one color, for example red, and change to a different color, such as gray, in a later time.

The order of words in the word list 420 may be arranged in different ways. For example, they may be arranged in alphabetical order as shown in FIG. 9. They may be arranged according their statistically frequency of use in the associated language, such as English. The processor 20 may also compile its own statistics by monitoring and collecting the frequency of each word selected by the user.

In another embodiment, the inventor distinguishes between ending a touch on (or touching) the list 420 by stopping touching the screen of the display 50 and sliding away from the list 420. Stopping touching the screen still results in the last touched word being entered into the entry field 400. However, sliding away from the list 420 in this embodiment may have a different effect. In this embodiment, if the user moves their finger to the left horizontally (or in a direction parallel to the orientation of a displayed word in the list 420) on the list 420, the number of alphabets for words listed in the list 420 is adjusted. For example, in FIG. 9, if the user slides to the left (or on a first direction parallel to the orientation of a displayed word in the list 420) on the list 420, the number of alphabets in each displayed word may be reduced from five to four and the word "there" will not be displayed because the number of alphabets in that word is more than four. The number of alphabets in a displayed is reduced according to the distance of the slide. For example, a distance of about N alphabets causes reduction of N alphabets. In a similar manner, if the user slides on a word in the list 420 to the right horizontally (or in a second direction parallel to the orientation of a displayed word in the list 420), the number of alphabets for each displayed word is increased.

The software of the above process in this embodiment is stored in the memory 30 that can be a computer readable medium, such as a hard disk, DVD, PROM, and SRAM.

In another embodiment, the display 50 does not include touch sensitive elements. Rather, the touch sensitive elements are provided in an area other than the display 50. For example, the touch sensitive elements are provided in a touch pad. A user may use a pointing device to point to the entry field 400 before the touching and at one end of the single row 410, for example, before the sliding.

As described above, the present invention provides, among other things, a method for enabling a user to enter symbols in a touch-sensitive screen in response to touching an entry field. While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for entering symbols using a touch screen device, said method comprising:
   detecting touching an entry field displayed on said touch screen device;
   displaying a plurality of symbols in a single row in response to said touching receiving step;
   detecting touching a first one of said displayed symbols; and
   if said touching is ended by stopping touching said touch screen device, a second one of said displayed symbols is detected to be last touched in said single row, and said second one of said displayed symbols is different from said first one of said displayed symbols, entering said second one of said displayed symbols into said entry field;
   wherein if said touching is ended by sliding away from said single row and said second one of said displayed symbols is an alphabet, said method further comprises displaying a list having at least one word beginning with said alphabet;
   detecting touching a first one of said at least one word and if said touching on said list is ended, entering said first one of said at least one word into said entry field;
   displaying an icon next to said first one of said at least one word in said entry field, such that when said icon is touched, said one of said at least one word is removed from said entry field; and
   removing said icon from said entry field upon receiving another entry to said entry field.

2. The method of claim 1, further comprising displaying said first one of said displayed symbols in a different location not overlapping with said displayed symbols responsive to said detecting of touching said first one of said displayed symbols.

3. The method of claim 1, wherein each symbol touched from said first one of said displayed symbols to said second one of said displayed symbols is displayed in a respective different location not overlapping said displayed symbols.

4. The method of claim 1, wherein each of said at least one word is limited to have at most a first number of alphabets.

5. The method of claim 4, further comprising if sliding in a direction parallel to an orientation of a word in said list is detected, adjusting said first number and displaying only words having at most said adjusted number of alphabets.

6. A touch screen device comprising:
   a memory for storing programs;
   a display having touch-sensitive screen; and
   a processor operative to display an entry field on said touch-sensitive screen in executing a program from said memory, detecting touching said entry field; display a plurality of symbols in a single row in response to said touching said entry field; detect touching a first one of said displayed symbols; and if said touching is ended by stopping touching said touch-sensitive screen, a second one of said displayed symbols is detected to be last touched in said single row, and said second one of said displayed symbols is different from said first one of said displayed symbols, enter said second one of said displayed symbols into said entry field;

wherein if said touching is ended by sliding away from said single row and said second one of said displayed symbols is an alphabet, said processor is further operative to display a list having at least one word beginning with said alphabet;

detect touching a first one of said at least one word and if said touching said list is ended, enter said first one of said at least one word into said entry field;

display an icon next to said first one of said at least one word in said entry field, such that when said icon is touched, said one of said at least one word is removed from said entry field; and remove said icon from said entry field upon receiving another entry to said entry field.

7. The touch screen device of claim 6, wherein said processor is further operative to display said first one of said displayed symbols in a different location not overlapping with said displayed symbols responsive to said detecting touching said first one of said displayed symbols.

8. The touch screen device of claim 6, wherein each symbol touched from said first one of said displayed symbols to said second one of said displayed symbols is displayed in a respective different location not overlapping said displayed symbols.

9. The touch screen device of claim 6, wherein each of said at least one word is limited to have at most a first number of alphabets.

10. The touch screen device of claim 9, wherein if sliding in a direction parallel to an orientation of a word in said list is detected, said processor is operative to adjust said first number and display only words having at most said adjusted number of alphabets.

11. A touch screen device comprising:

means for storing programs;

a display having touch-sensitive screen; and a processing means operative to display an entry field on said touch-sensitive screen in executing a program from said memory, detecting touching said entry field; display a plurality of symbols in a single row in response to said touching said entry field; detect touching a first one of said displayed symbols; and if said touching is ended by stopping touching said touch-sensitive screen, a second one of said displayed symbols is detected to be last touched in said single row, and said second one of said displayed symbols is different from said first one of said displayed symbols, enter said second one of said displayed symbols into said entry field;

wherein if said touching is ended by sliding away from said single row and said second one of said displayed symbols is an alphabet, said processing means is further operative to display a list having at least one word beginning with said alphabet;

detect touching a first one of said at least one word and if said touching said list is ended, enter said first one of said at least one word into said entry field;

display an icon next to said first one of said at least one word in said entry field, such that when said icon is touched, said one of said at least one word is removed from said entry field; and remove said icon from said entry field upon receiving another entry to said entry field.

12. The touch screen device of claim 11, wherein said processing means is further operative to display said first one of said displayed symbols in a different location not overlapping with said displayed symbols responsive to said detecting touching said first one of said displayed symbols.

13. The touch screen device of claim 11, wherein each symbol touched from said first one of said displayed symbols to said second one of said displayed symbols is displayed in a respective different location not overlapping said displayed symbols.

14. The touch screen device of claim 11, wherein each of said at least one word is limited to have at most a first number of alphabets.

15. The touch screen device of claim 14, wherein if sliding in a direction parallel to an orientation of a word in said list is detected, said processing means is operative to adjust said first number and display only words having at most said adjusted number of alphabets.

* * * * *